United States Patent [19]
Takamoto et al.

[11] Patent Number: 5,555,030
[45] Date of Patent: Sep. 10, 1996

[54] COMPONENT VIDEO SIGNAL TO COMPOSITE VIDEO SIGNAL ENCODING SYSTEM, CONTROL SYSTEM AND METHOD

[75] Inventors: Sohei Takamoto, Fremont; Douglas J. George, Sunnyvale; Luigi C. Gallo, Woodside, all of Calif.

[73] Assignee: Accom, Inc., Menlo Park, Calif.

[21] Appl. No.: 808

[22] Filed: Jan. 5, 1993

Related U.S. Application Data

[63] Continuation of Ser. No. 424,792, Oct. 20, 1989, abandoned.

[51] Int. Cl.$^6$ ...................................................... H04N 11/00
[52] U.S. Cl. ........................ 348/642; 348/453; 348/708
[58] Field of Search ....................... 358/21 R, 22, 358/27, 28, 29, 30, 37, 160, 166, 185, 181, 183, 13, 11; 348/571, 575, 576, 577, 578, 580, 581–584, 642, 453, 644–654, 712, 713, 708, 720, 722, 723; H04N 11/04, 11/20, 11/00, 9/65, 7/13, 7/01, 9/79, 9/80, 9/87

[56] References Cited

U.S. PATENT DOCUMENTS

| | | | |
|---|---|---|---|
| 4,703,356 | 10/1987 | Herzog | 358/21 R |
| 4,800,423 | 1/1989 | Appiano | 358/21 R |
| 4,823,184 | 4/1989 | Belmares-Sarabia | 358/27 |
| 4,941,186 | 7/1990 | Massmann | 358/21 R |
| 4,991,223 | 2/1991 | Bradley | 358/22 |
| 4,994,901 | 2/1991 | Parulski | 358/21 R |
| 5,005,073 | 4/1991 | Rufray | 358/21 R |
| 5,057,911 | 10/1991 | Stec et al. | 358/13 X |
| 5,111,281 | 5/1992 | Sekiguchi | 348/650 |
| 5,305,094 | 4/1994 | Belmores-Sarabis | 348/646 |

FOREIGN PATENT DOCUMENTS

| | | | |
|---|---|---|---|
| 2172466 | 9/1986 | United Kingdom | H04N 9/64 |

OTHER PUBLICATIONS

Swart, M "New Plug-ins for Insertion–Signal Generator SPZF" News from Rohde & Schwarz vol. 16 #72 pp. 14–18 1976.

*Primary Examiner*—David E. Harvey
*Attorney, Agent, or Firm*—Flehr, Hohbach, Test, Albritton & Herbert

[57] ABSTRACT

In a component video signal to composite video signal encoding system (10), the component input signals are stored in a first in, first out (FIFO) memory. The FIFO memory is connected by 1 luminance and 2 chrominance outputs to a rate converter, which increases the digital sampling rate of the signals as received from the FIFO memory. The rate converter is in turn connected by 1 luminance and 2 chrominance outputs to luminance and chrominance processing circuits. The luminance and chrominance processing circuits produce the composite video signals, and are connected to a D2 standard driver circuit. The output of the D2 driver circuit is D2 standard digital component signals. The luminance and chrominance processing circuits are also connected to a digital to analog (D/A) converter. The output of the D/A converter is an analog PAL or NTSC component video signal.

15 Claims, 17 Drawing Sheets

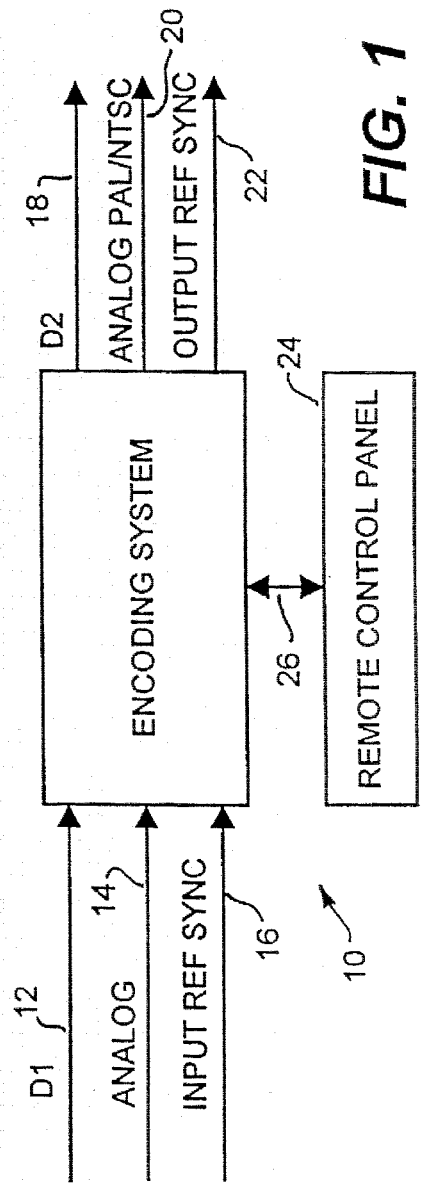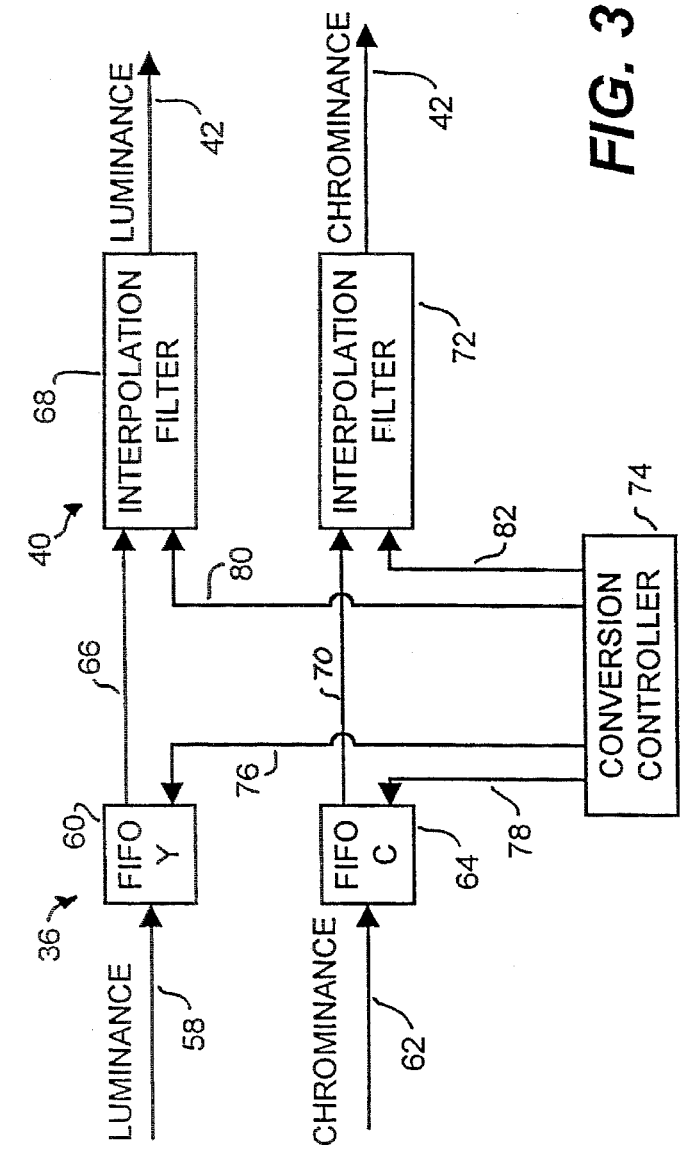

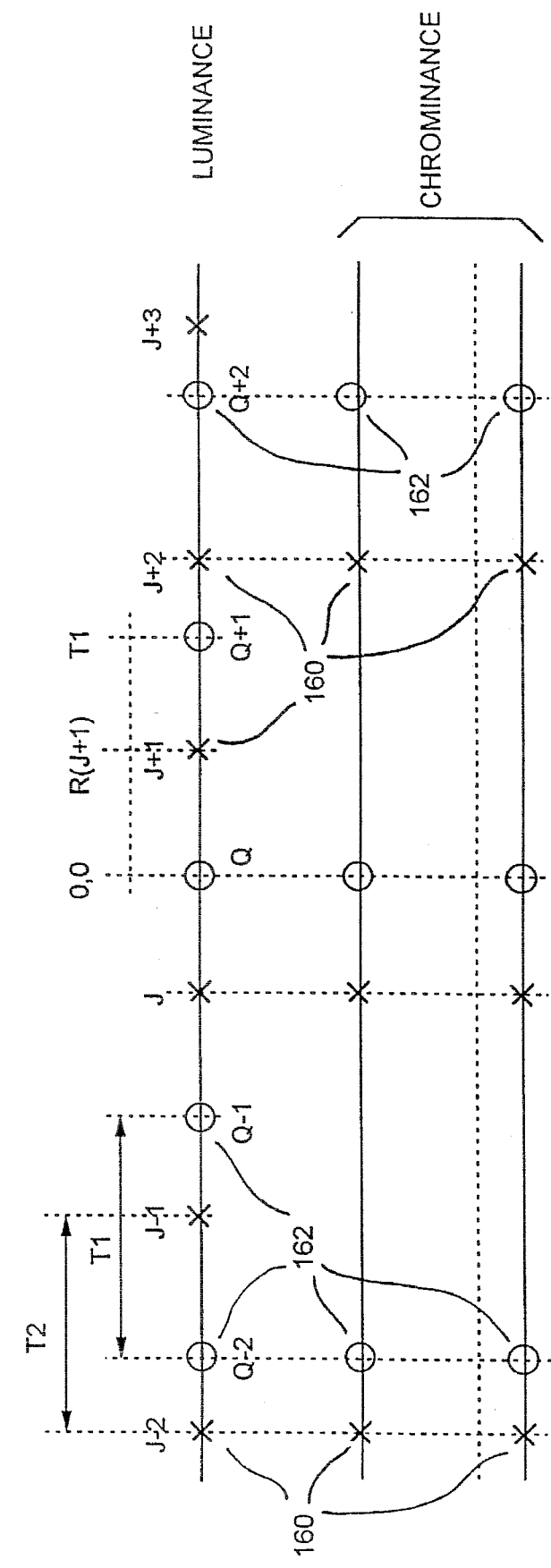

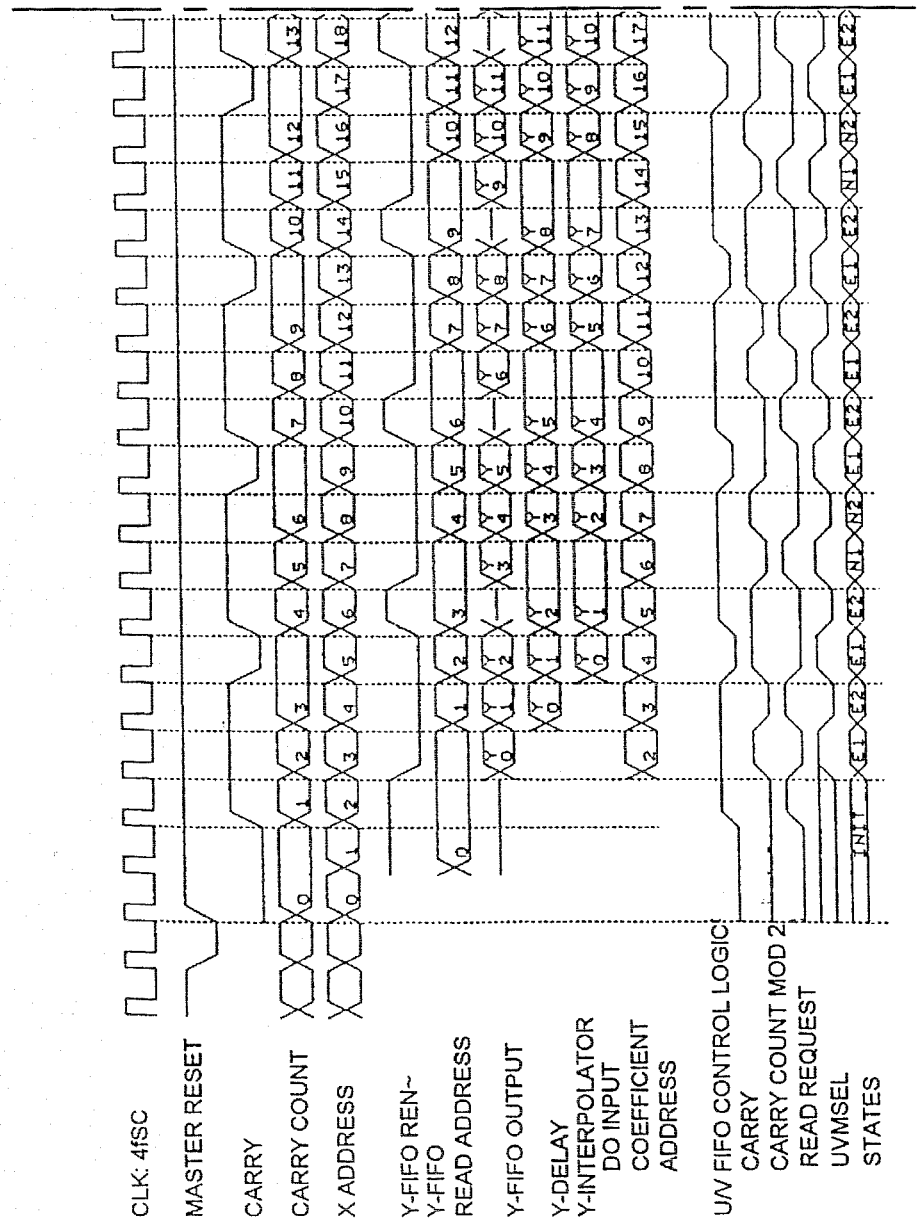
FIG. 6A1

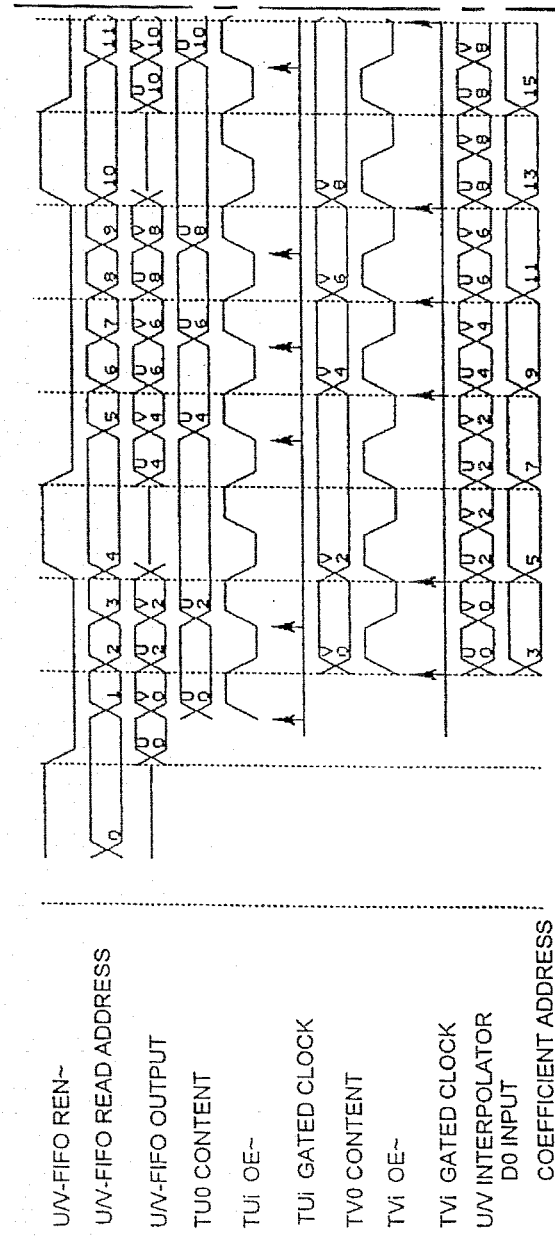
FIG. 6A2

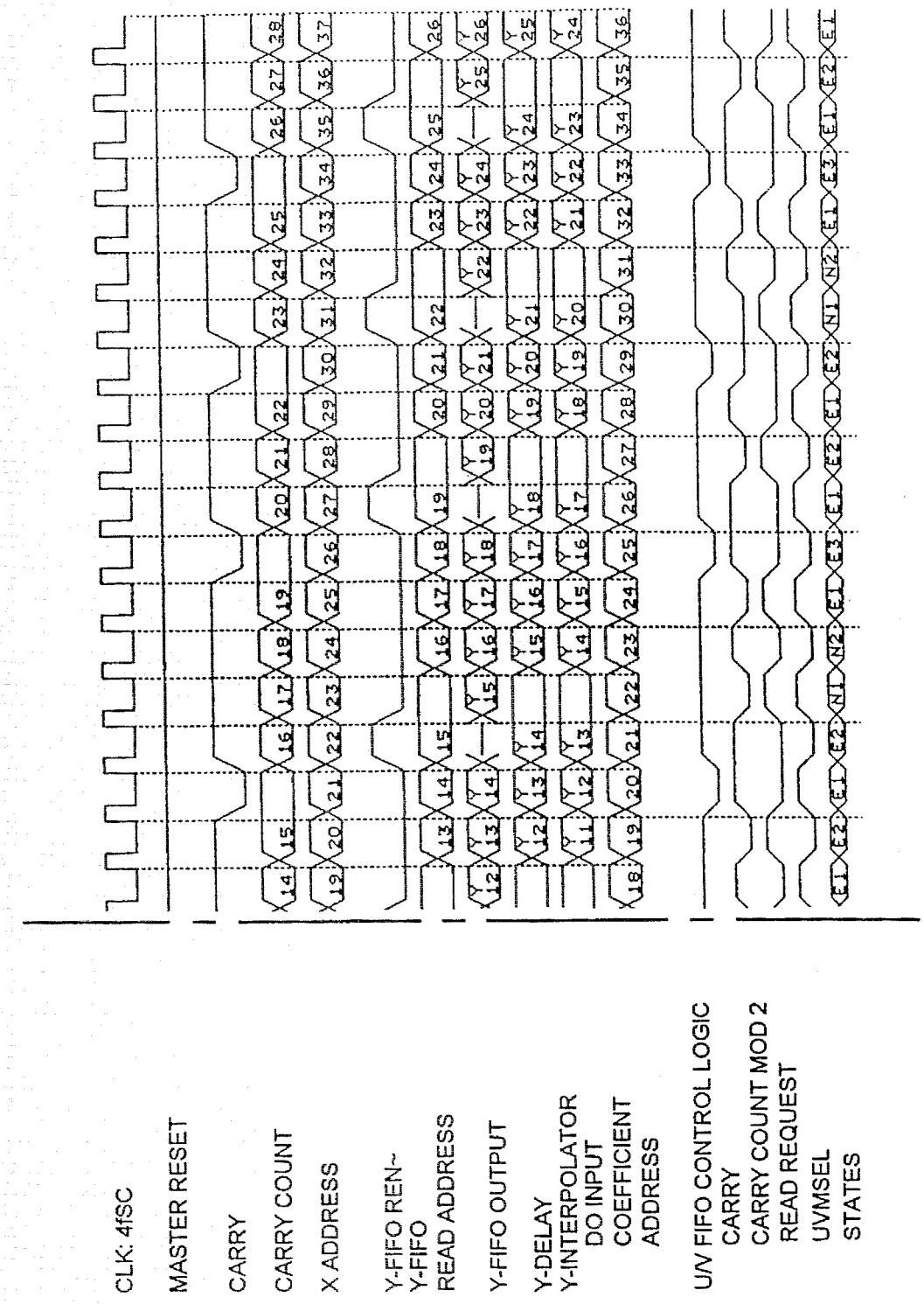
FIG. 6B1

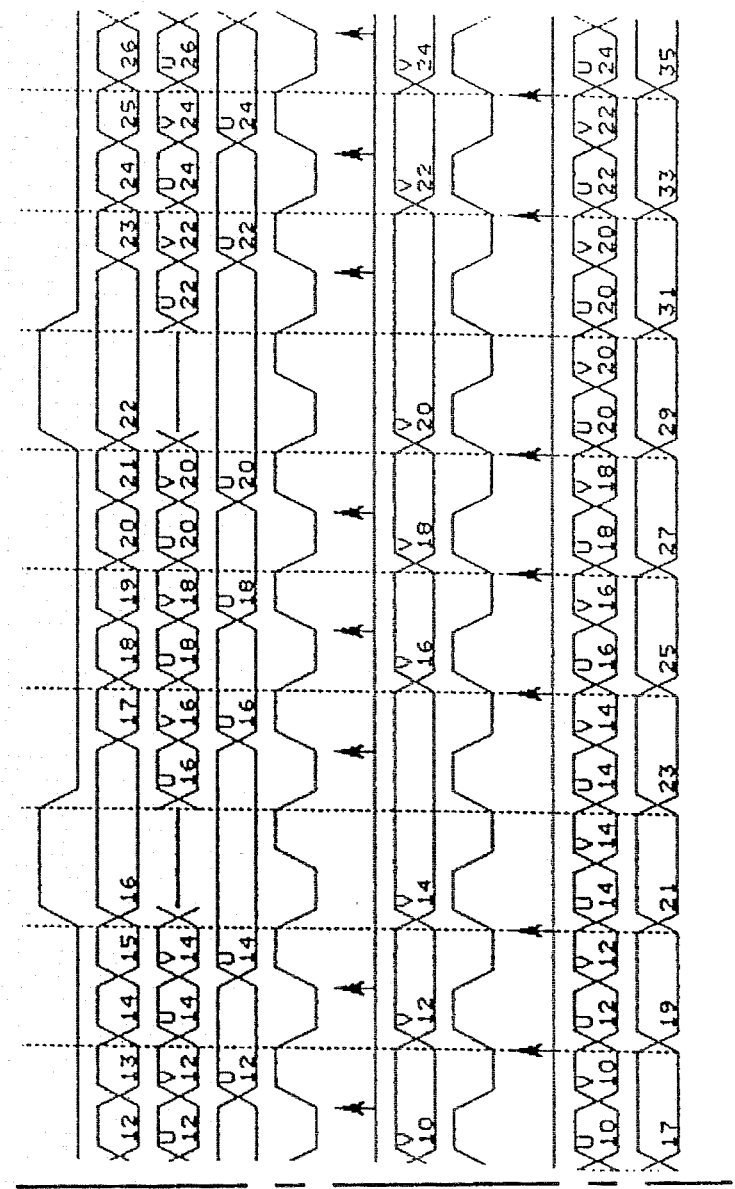
FIG. 6B2

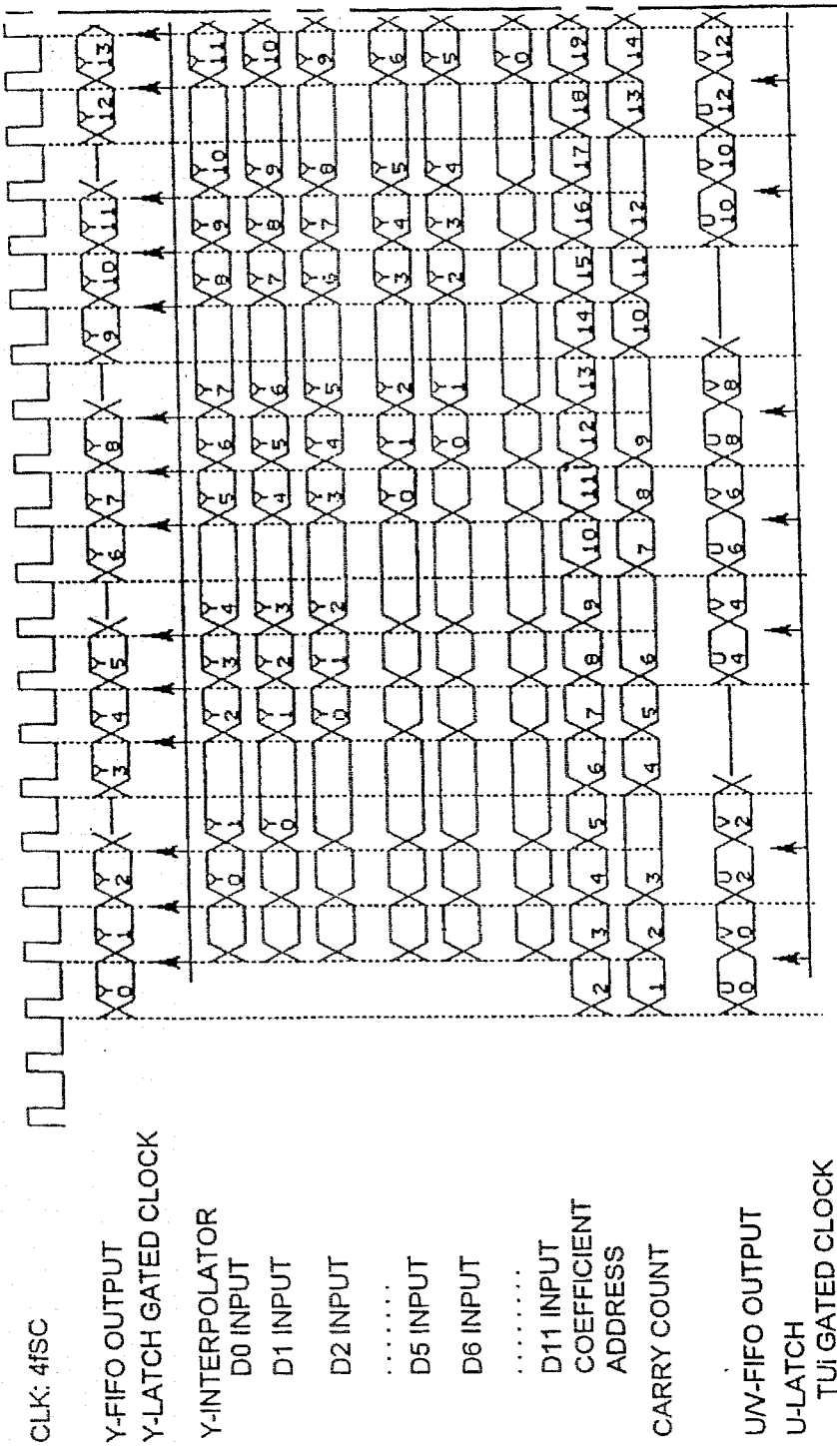
FIG. 6C1

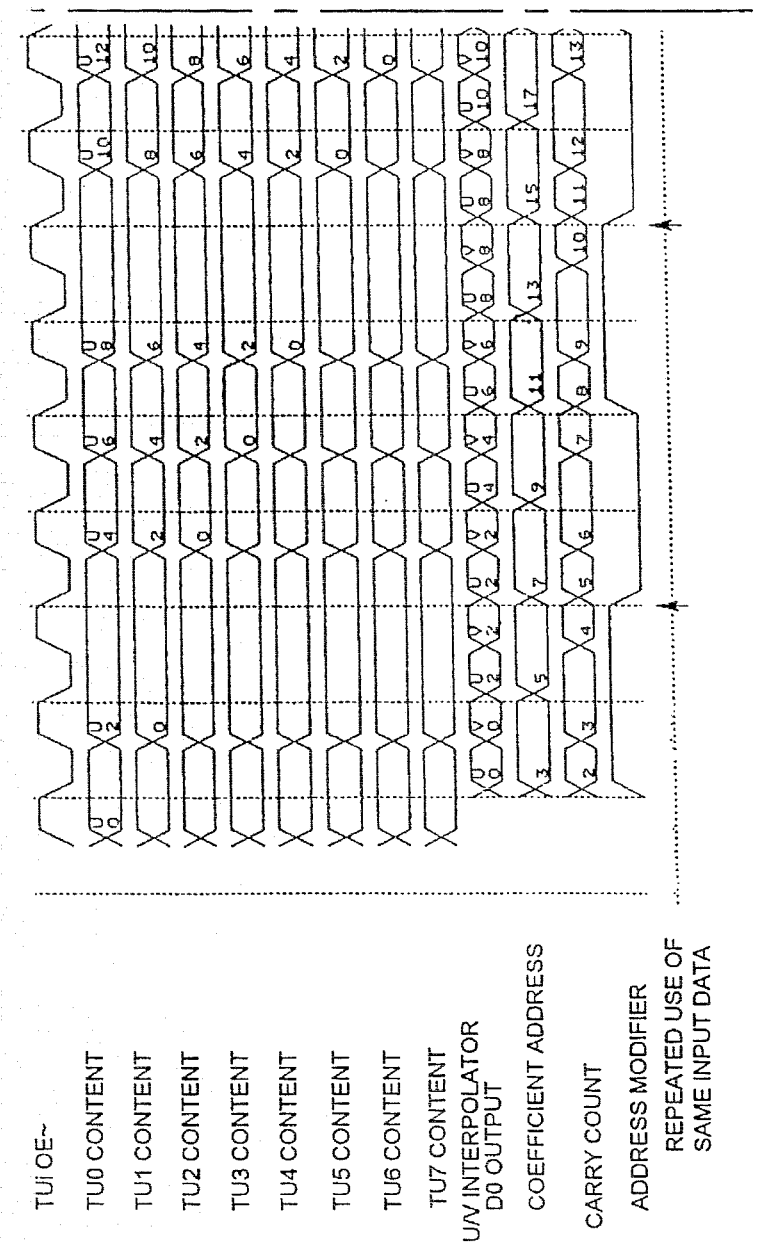

FIG. 6C2

INTERPOLATOR INPUT TIMING

NOTE:
1. Y-SIGNAL
   12-POINT INPUT; GATED 4fSC CLOCK; AVERAGE RATE 13.5MHz
2. U/V-SIGNAL
   8-POINT INPUT; STAGGERED TIMING FOR U/V MULTIPLEXING; GATED 2fSC CLOCK; AVERAGE RATE 6.75MHz
   ADDRESS MODIFIER TELLS WHICH HALF OF TARGET RANGE THE ADDRESS SHOULD BE MAPPED
3. TIMING
   Y AND U/V TIMING MATCH, FOR EXAMPLE, Y0 IN D5 ("O" POSITION), WHEN ADDRESS IS 11, COUNT IS 8;
   U0 IN TU3 ("O" POSITION), WHEN ADDRESS IS 11, COUNT IS 8

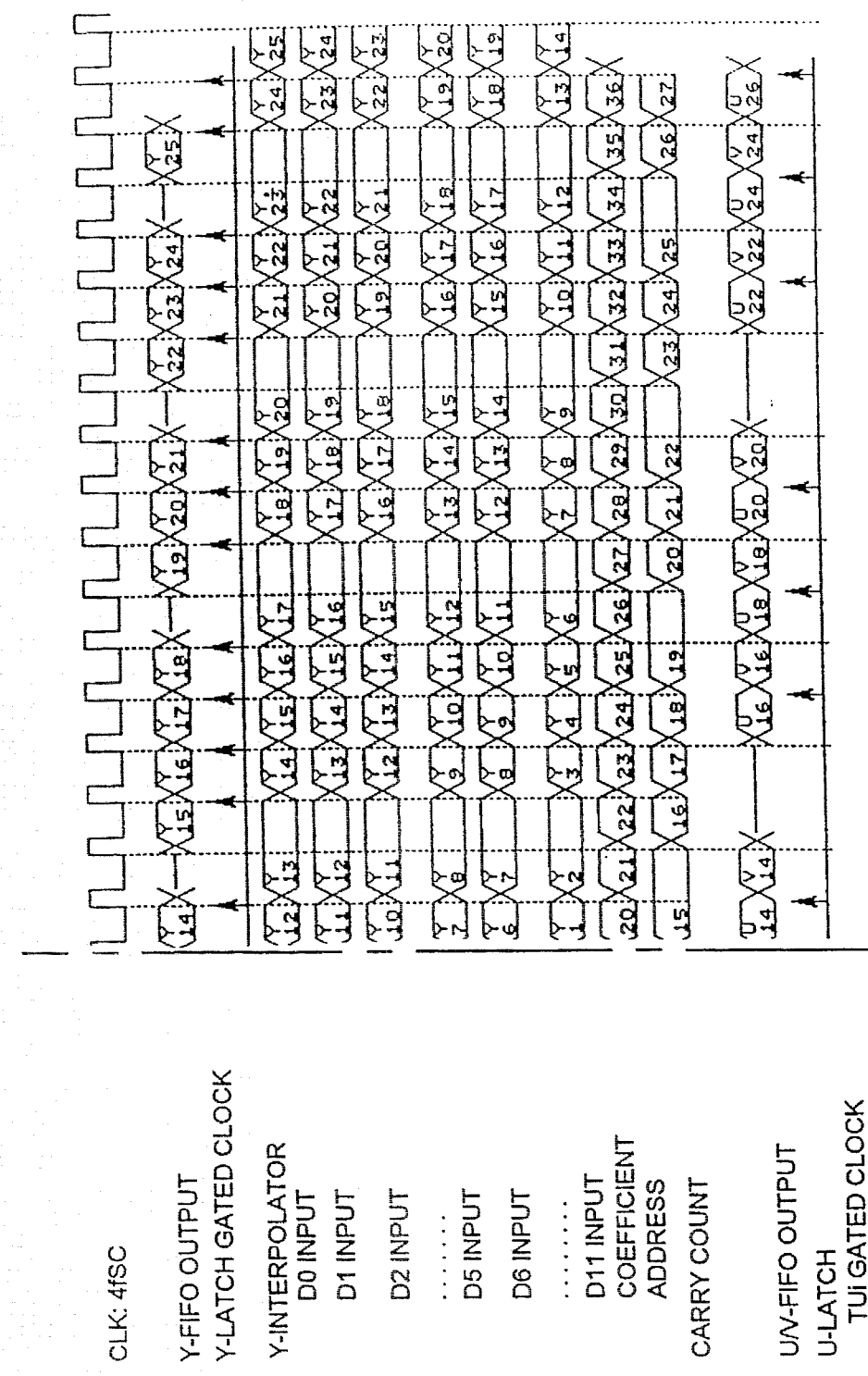
FIG. 6D1

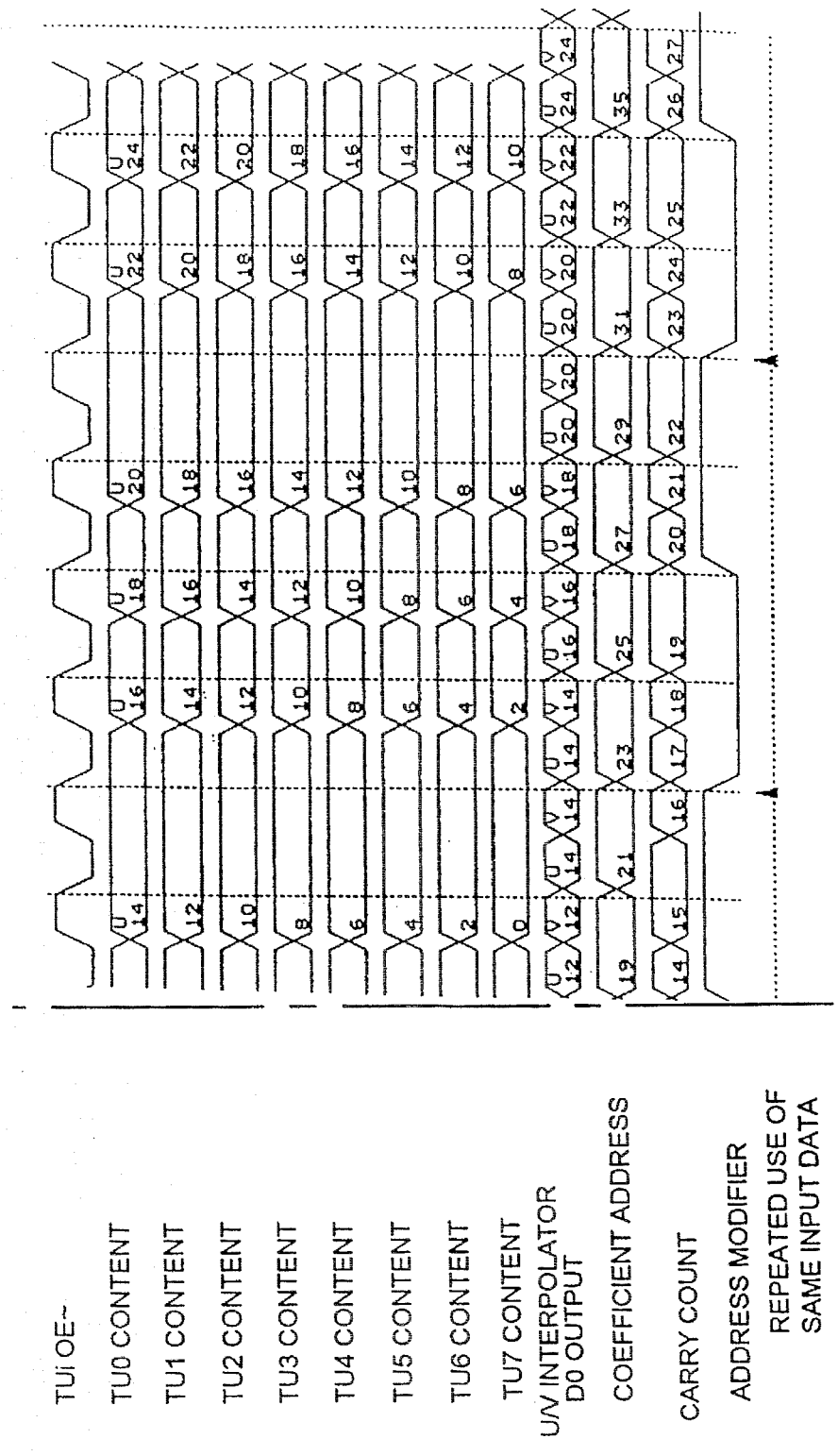
FIG. 6D2

COMPONENT VIDEO SIGNAL TO COMPOSITE VIDEO SIGNAL ENCODING SYSTEM, CONTROL SYSTEM AND METHOD

This is a continuation, of application Ser. No. 07/424,792 filed Oct. 20, 1989, now abandoned.

BACKGROUND OF THE INVENTION

1. Field of the Invention

The present invention relates generally to a system and method for encoding component video signals to composite form. More particularly, it relates to such a system and method in which encoding is accomplished with all digital circuitry to provide consistent and predictable encoding results without annoying luminance and color cross-products. Most especially, it relates to such a system and method for encoding component video signals to composite form in which there is a frequency shift between the input component signals and the output composite signals.

2. Description of the Prior Art

The state of the art of encoding video signals to composite form from component form is indicated by Clarke, "Colour Encoding and Decoding Techniques for Line-Locked Sampled PAL and NTSC Television Signals," BBC Research Department, Report BBC RD 1986/2, March, 1986. Since the beginning of composite video, the uncertainties of the encoding process and the effects of the cross-luminance and cross-color products have plagued the pursuit of picture quality and consistency.

As disclosed in the above report, when component input video signals are encoded to composite form, there is usually a change in frequency from the input component signals and the output composite signal. For example, digital D1 standard input component signals have a frequency of 13.5 MHz, and digital D2 standard composite output signals have a frequency of four times the subcarrier frequency, or 14.3 MHz for NTSC signals and 17.7 MHz for PAL signals. As a result, a sample rate conversion is required during the encoding process in order to produce consistency of sampling. Changing the sampling rate results in phase differences of the samples with respect to the input composite signals. The additional samples required in order to increase frequency between the input component signals and the output composite signals are obtained by an interpolation process. The conventional approach uses a doubled sampling rate to create two interpolated samples in each half cycle of the input component signals. Using a double sampling rate requires a doubled clock frequency for the sampling circuits. It would be desirable to be able to provide a suitable change in the sampling rate using a lower clock frequency.

In the encoding of component video signals to composite video signals, the luminance component and chrominance component are processed separately prior to their additive combination to produce the composite video signals. The luminance and chrominance components each provide information for the visible portion of the component signal and the processing adds a non-visible portion, provided during the blanking interval to control the visible portion. When the two components are combined, abrupt transitions are produced between the visible and non-visible portions of the composite video signals.

SUMMARY OF THE INVENTION

Accordingly, it is an object of this invention to provide a video signal component to composite encoding system and method using all-digital techniques for the encoding to provide consistent and predictable encoding results without annoying luminance and color cross-products.

It is another object of the invention to provide such a video signal component to composite encoding system which does not require re-calibration before each critical session to get consistent encoding results.

It is a further object of the invention to provide such a video signal component to composite encoding system and method that will interpolate between sampling intervals for rate conversion of component video signals without requiring a doubling of clock frequency.

It is another object of the invention to provide such a video signal component to composite encoding system and method that will eliminate abrupt transitions between the visible and non-visible portions of the composite video signals.

It is a further object of the invention to provide such an encoding system and method which provides digital control of important video correction and encoding parameters.

It is still another object of the invention to provide such an encoding system that can store complete encoding set-ups which can be recalled for quick change between encoding requirements, even on a scene to scene basis.

It is a still further object of the invention to provide such an encoding system that incorporates all of the conventionally used encoding operational features built-in a single system.

The attainment of these and related objects may be achieved through use of the novel video signal component to composite encoding system and method herein disclosed. A video signal component to composite encoding system in accordance with a first form of this invention has a first in, first out memory. Inputs for component video signals are connected to the first in, first out memory. A means is connected to the first in, first out memory for sampling the component video signals in the first in, first out memory at a first frequency. A means is connected to the first in, first out memory for receiving sampled video signals at the first frequency and for converting the sampled video signals to a second frequency. A means is connected to the means for receiving and for converting for combining the sampled component video signals to form composite video signals.

In a second form of a video signal component to composite encoding system of this invention, the component video signals include a visible portion. The system has a means for providing a non-visible portion in the component video signals. A means is connected to the means for providing the non-visible portion in the component video signals, for combining the component video signals to form composite video signals. A means for soft blanking the composite video signal resulting from combining the component video signals is connected to the means for combining.

In another aspect of the invention, the encoding system includes an external means for supplying control inputs to the component video signal to composite video signal encoding system. The external means for supplying control inputs controls at least one video signal encoding parameter on a frame-by-frame basis. The external means for supplying control inputs is implemented as a front panel or remote control for user inputs or an external computer for automatic control of encoding parameters.

In the video signal component to composite encoding method, the component video signals are stored in a first in, first out memory. The component video signals in the first in, first out memory are sampled at a first frequency. The sampled video signals are converted to a second frequency. The sampled component video signals are converted to form composite video signals.

The attainment of the foregoing and related objects, advantages and features of the invention should be more readily apparent to those skilled in the art, after review of the following more detailed description of the invention, taken together with the drawings, in which:

BRIEF DESCRIPTION OF THE DRAWINGS

FIG. 1 is a block diagram of a video signal component to composite encoding system in accordance with the invention.

FIG. 3 is a more detailed block diagram of a portion of the encoding system of FIGS. 1 and 2.

FIG. 6 is a key showing placement of FIGS. 6A–6D.

FIGS. 6A–6E are waveform diagrams useful for understanding operation of the encoding system portions shown in FIGS. 3 and 5.

DETAILED DESCRIPTION OF THE INVENTION

Turning now to the drawings, more particularly to FIG. 1, there is shown a encoding system 10, which receives a component digital D1 standard video input signals at 12 or a composite analog video input signal at 14. Input signal timing is provided by an input reference synchronizing signal at 16. The input signals at 12 or 14 are encoded by the system 10 and provided as composite digital D2 standard video signals at 18 or PAL/NTSC standard analog video signals at 20. Output signal timing is provided by an output reference synchronizing signal at 22. A control panel 24 is connected at 26 to the encoding system 10 to provide digital control of the important encoding parameters to provide encoding flexibility.

Figure 2:
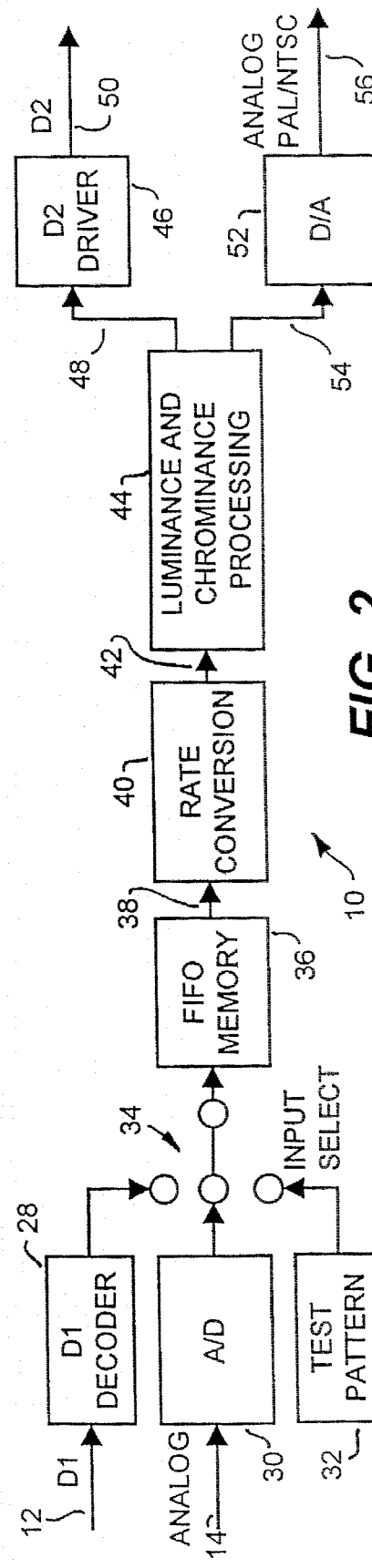
FIG. 2 is a more detailed combined block diagram and flow chart of the encoding system of FIG. 1.

FIG. 2 shows the basic functions that are provided within the encoding system 10. The component digital D1 input at 12 is decoded by D1 decoder 28. The component analog signals at 14 are converted to digital form by an analog to digital (A/D) converter 30. Digital test pattern component signals are generated by a test pattern generator 32. Switch 34 allows selection of the component input signals to the encoding system 10. In the encoding system 10, the selected component input signals are stored in a first in, first out (FIFO) memory 36. The FIFO memory 36 is connected by 1 luminance and 2 chrominance outputs at 38 to a rate converter 40, which increases the digital sampling rate of the signals as received from the FIFO memory 36. The rate converter 40 is in turn connected by 1 luminance and 2 chrominance outputs at 42 to luminance and chrominance processing circuits 44. The luminance and chrominance processing circuits 44 produce the composite video signals, and are connected to a D2 standard driver circuit 46 at 48. The output of the D2 driver circuit 46 is D2 standard digital component signals at 50. The luminance and chrominance processing circuits 44 are also connected to a digital to analog (D/A) converter 52 at 54. The output of the D/A converter 52 is an analog PAL or NTSC component video signal at 56.

Details of the FIFO memory 36 and rate converter 40 are shown in FIG. 3. The luminance component of the digital component video signal is supplied on line 58 to a luminance FIFO memory 60 in the FIFO memory 36. The chrominance component of the digital component video signal is supplied on two lines at 62 to a chrominance FIFO memory 64 in the FIFO memory 36. Output 66 of the luminance FIFO memory is connected to a luminance interpolation filter 68 in the rate converter 40. Output 70 of the chrominance FIFO memory 64 is connected to a chrominance interpolation filter 72 in the rate converter 40. A rate conversion controller 74 is connected to the luminance FIFO memory 60, chrominance FIFO memory 64, luminance interpolation filter 68 and chrominance interpolation filter 72 by lines 76, 78, 80 and 82, respectively. Rate converted luminance and chrominance component signals are supplied by the interpolation filters 68 and 72 on lines 42.

Figure 4:
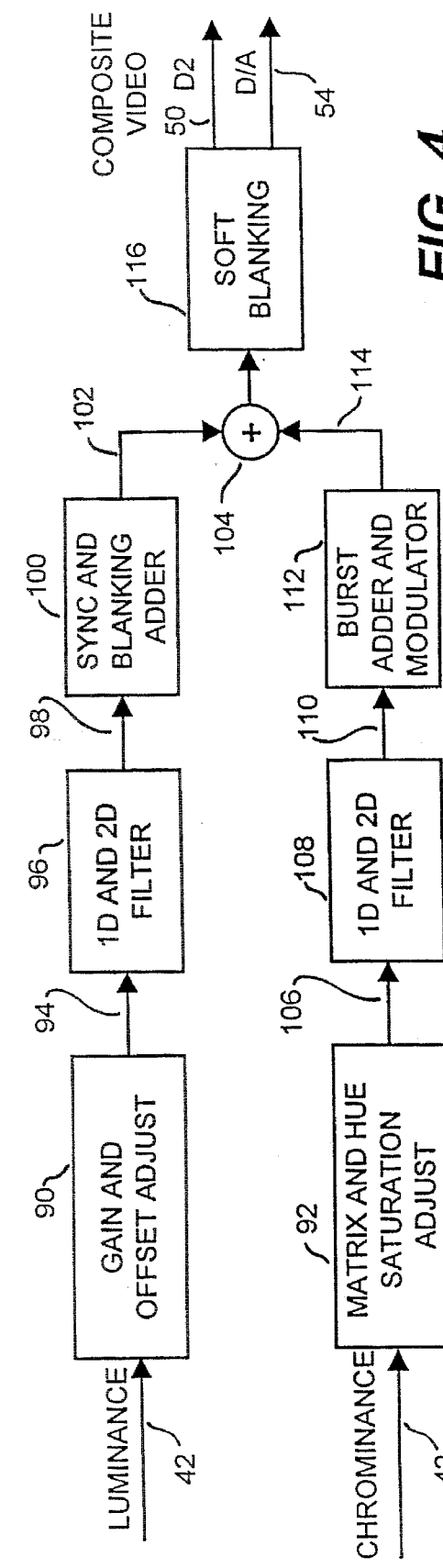
FIG. 4 is a more detailed block diagram of another portion of the encoding system shown in FIGS. 1 and 2.
Figure 5:
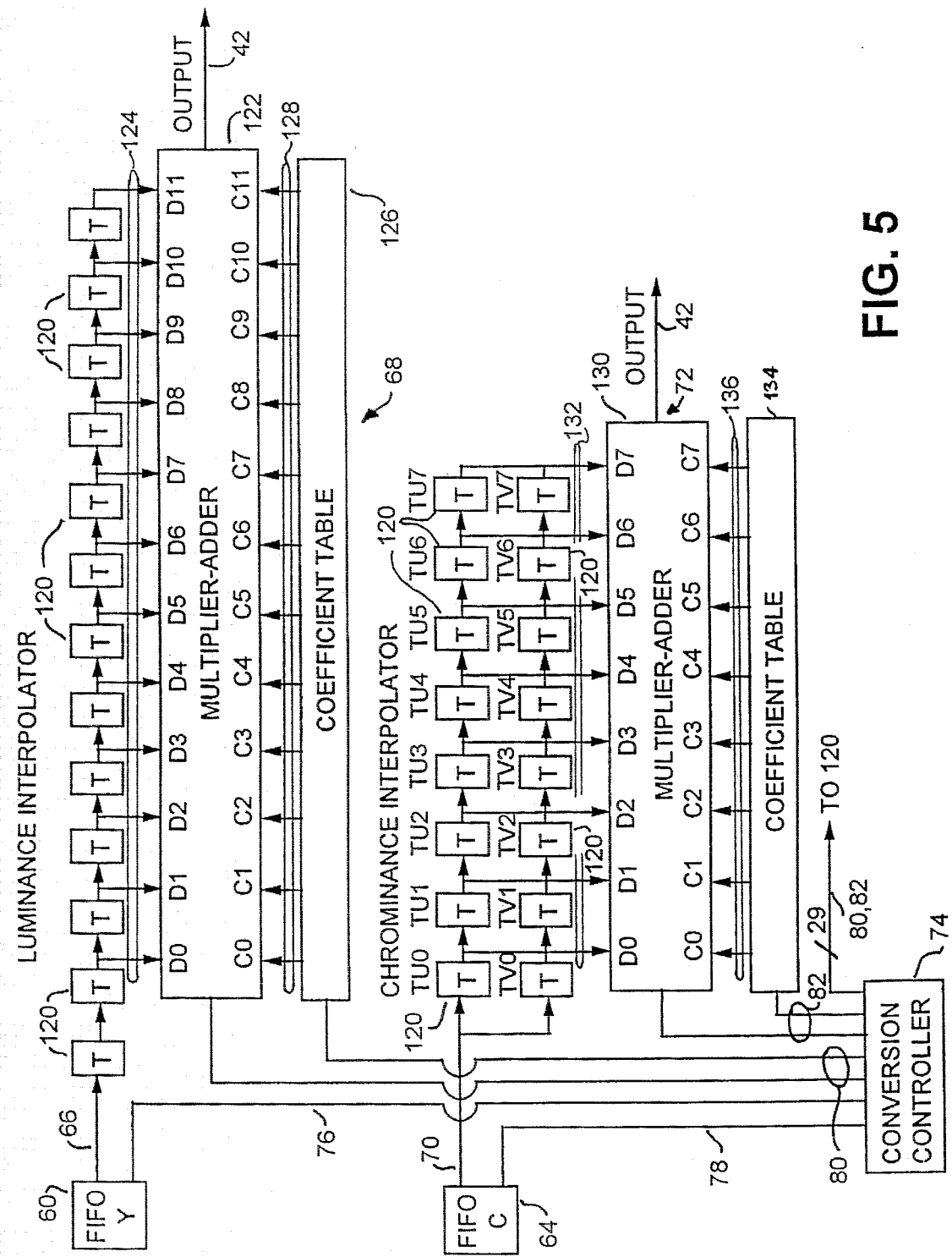
FIG. 5 is a more detailed block diagram of a part of the encoding system portion shown in FIG. 3.

Details of the luminance and chrominance processing circuits 44 are shown in FIG. 4. The luminance and chrominance component signals from the interpolation filters 68 and 72 are supplied on lines 42 to gain and offset adjust circuits 90 and matrix and hue saturation adjust circuits 92, respectively. The gain and offset adjust circuits 90 are connected at 94 to 1D and 2D filters 96. The 1D and 2D filters 96 are serially connected. They function to eliminate crosstalk with the chrominance signals by reducing signal energy in boundary regions. The output of the 1D and 2D filters 96 at 98 represents the visible portion of the luminance signals, and is supplied to sync and blanking adder circuits 100, which add a non-visible portion to the visible portion of the luminance signals. The non-visible portion is used during the vertical blanking interval (VBI) to control display of the visible portion. The completed luminance component signals are supplied at 102 to adder 104.

The matrix and hue saturation adjust circuits 92 convert the chrominance signals from one set of primary color signals to another, for example from U and V form in the D1 standard to I and Q in the NTSC standard. A 2×2 matrix is used for this purpose. The output of the matrix and hue saturation adjust circuits 92 is supplied at 106 to 1D and 2D filters 108 for crosstalk elimination. The output of the 1D and 2D filters 108 represents the visible portion of the chrominance component signals and is supplied at 110 to burst adder and modulator circuits 112, which add the non-visible portion of the chrominance signals. The burst adder and modulator circuits 112 also shift the base band signal to the vicinity of the subcarrier frequency for the desired output composite signal standard. The output of the burst adder and modulator circuits 112 is supplied at 114 to the adder circuit 104. The output of the adder circuit 104 is a composite video signal and is supplied to soft blanking circuits 116. The soft blanking circuits 116 eliminate abrupt transitions in the visible and non-visible portions of the composite video signal arising from the adding process. The soft blanking circuits 116 provide the D2 standard composite video signal at 50 or a digital composite video signal at 54 suitable for conversion by D/A converter 52 to analog form.

FIGS. 5 and 6A–6E show further details of the construction and operation of the interpolation filters 68 and 72. The filters 68 and 72 each consist of a plurality of delay circuits 120, each of delay interval T. For the interpolation filter 68, the delay circuits are serially connected together, with the outputs of the second through the last delay circuit 120 each providing an input to multiplier-adder circuit 122 at 124. The delay circuits 120 are implemented with transversal latches. A coefficient table lookup memory 126 provides coefficients inputs to the multiplier-adder circuit 122 at 128. In the interpolation filter 72, the transversal latch circuits 120 are arranged in two rows and are connected to multiplier-adder circuit 130 by outputs 132 in order to provide two time-multiplexed chrominance components to the multiplier-adder circuit 130. A coefficient table lookup memory 134 provides coefficients inputs to the multiplier-adder circuit 130 at 136.

In operation, the conversion controller 74 provides read control on lines 76 and 78 for the luminance FIFO memory 60 and the chrominance FIFO memory 64. It provides data shift control, data enable/disable, coefficient table addresses and maintains synchronism for luminance and chrominance component signals with control and address signals on lines 80 and 82. The control and address signals are shown in FIGS. 6A–6D.

FIG. 6E is useful for understanding the interpolation process in the interpolation filters 68 and 72. As shown, with output samples 160 at a clock frequency of 1/T2, 1/(2*T2) and input samples 162 at a clock frequency of 1/T1, 1/(2*T1, where T1>T2, so that the frequency of the output samples is greater than that of the input samples, the output samples 160 drift with respect to the periodicity of the input samples 162. The higher frequency output samples 160 are obtained by interpolation from the lower frequency input samples 162. The interpolation values depend on the relative positioning of the output samples 160 between two input samples 162. The interpolation points are calculated by the relationship:

$$J*T2+T0=Q(J)*T1+R(J),$$

where

T1 is the input clock period,

J is the number of output clock cycles from time 0,

T0 is the initial time difference from input to output clock,

Q(J) is the number of input clock cycles from T0 to time J,

R(J) is the time residual, R(J)<T1.

For example, output sample J+1 is interpolated at point R(J+1) between point 0,0 and point T1, for input point Q and Q+1, respectively.

Figure 7:
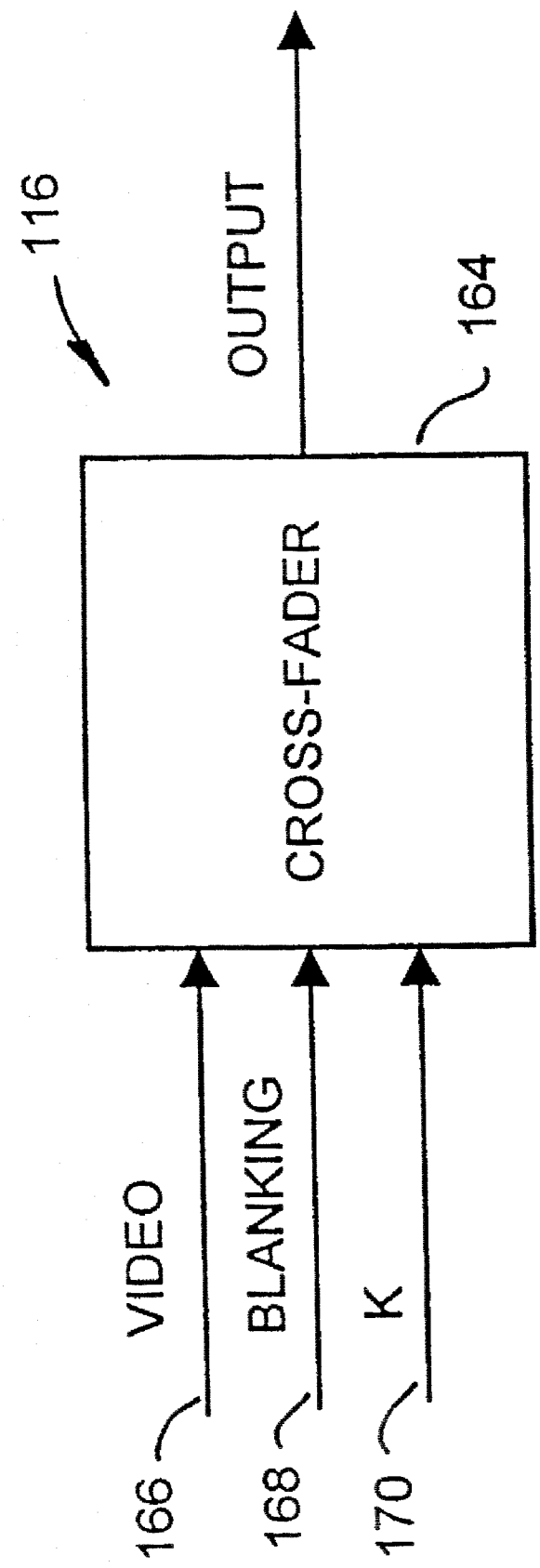
FIG. 7 is a block diagram of a part of the encoding system portion shown in FIG. 4.
Figure 8:
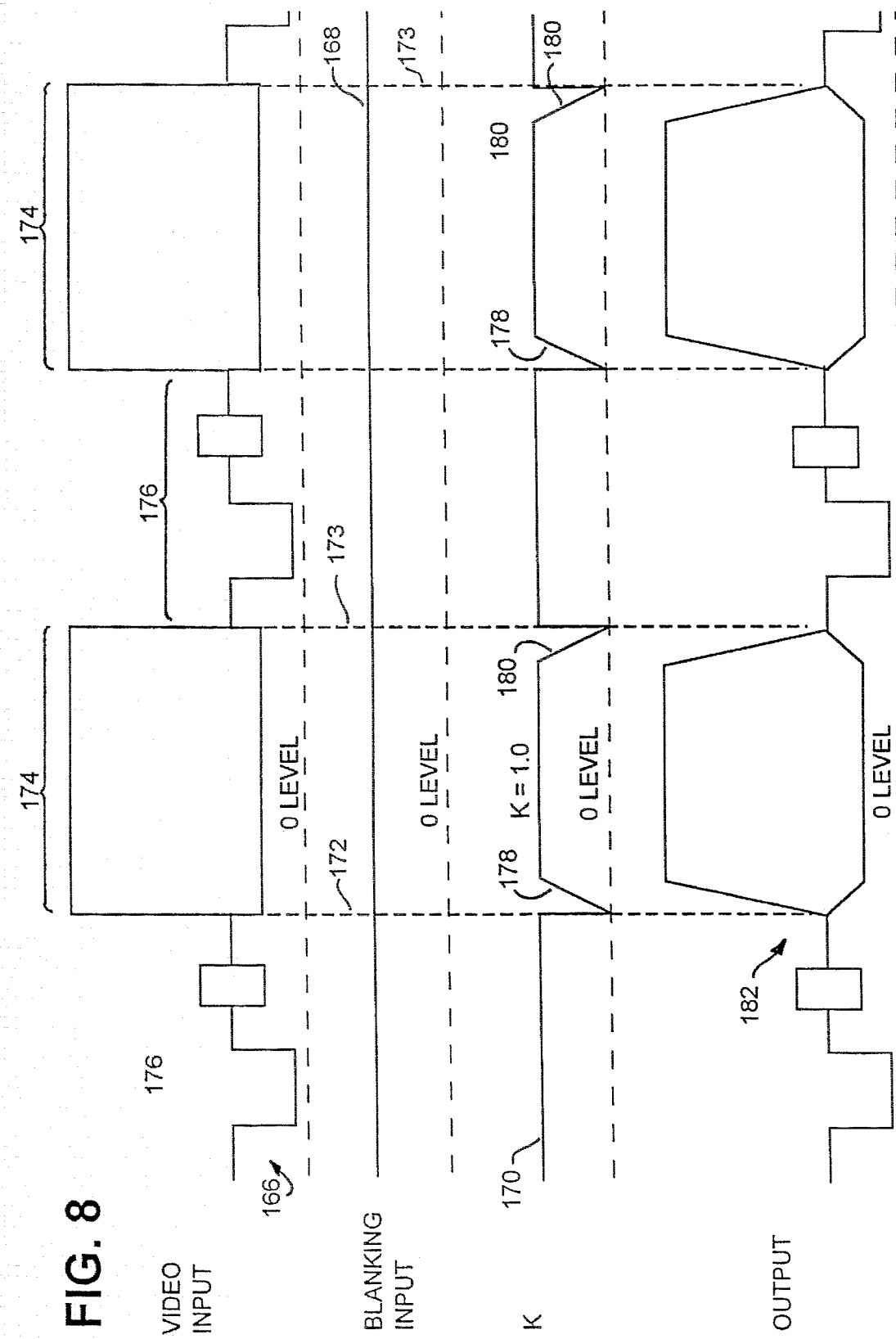
FIG. 8 is a waveform diagram useful for understanding operation of the part of the encoding system shown in FIG. 7.

Details of the soft blanking circuits 116 and their operation are provided by FIGS. 7 and 8. The soft blanking circuits 116 are implemented with a cross-fader 164. Inputs to the cross-fader 164 are composite video signal 166 from adder 104, blanking input 168 and a correction signal 170, also designated K, which is 1 except at transitions 172 and 173 between visible portions 174 and non-visible portion 176 of the composite video signal 166. At the transitions 172 from non-visible portions 176 to visible portions 174, the correction signal 170 drops to 0, then makes a smooth transition 178 from 0 back to 1. At the transitions 173 from the visible portions 174 to the non-visible portions 176, the correction signal makes a smooth transition 180 from 1 to 0, then abruptly returns to 1. The transitions 178 and 180 need not be linear as shown, as long as they are smooth. As a result of the smooth transitions 178 and 180, output signal 182 from the cross fader 164 has the form shown.

The cross-fader 164 implements the function:

$$\begin{aligned}\text{Output} &= \text{Video}*K+\text{Blanking}*(1-K)\\ &= (\text{Video}-\text{Blanking})*K+\text{Blanking}.\end{aligned}$$

This function is implemented with a single multiplier and adder.

Figure 9:
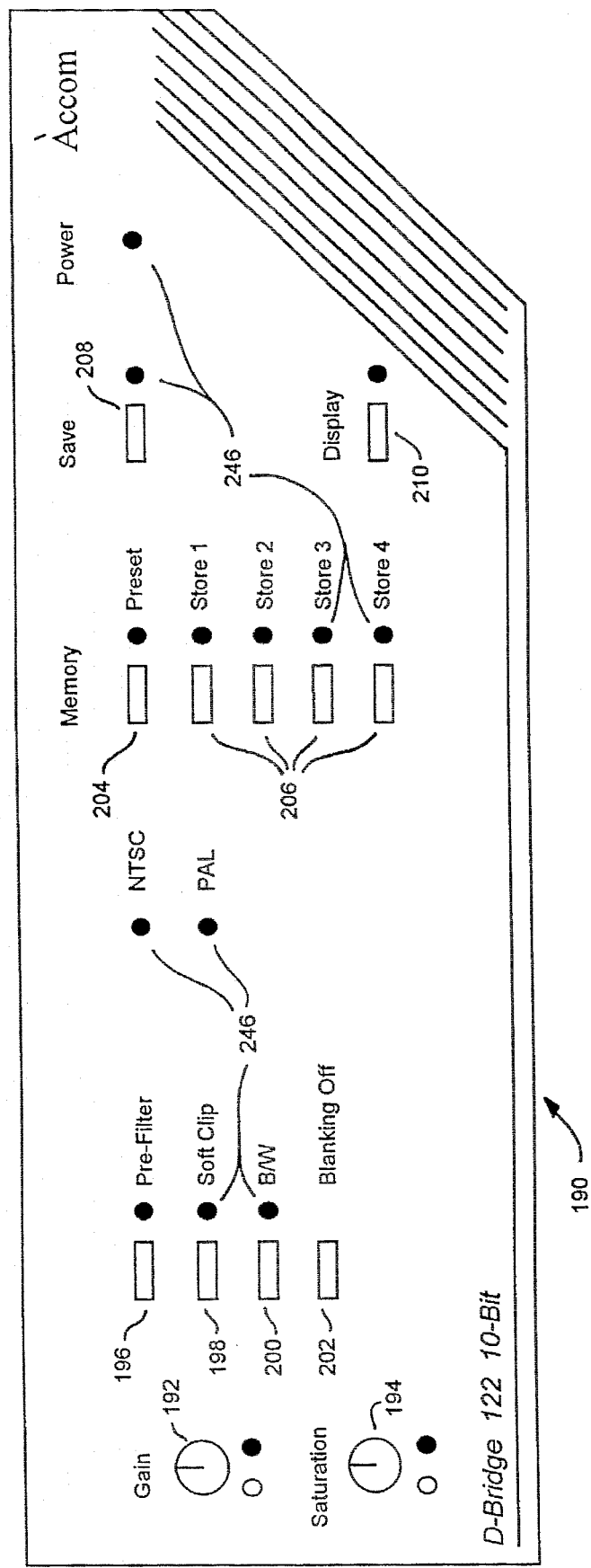
FIG. 9 is a plan view of a control panel for the encoding system of FIGS. 1–5 and 7.

FIG. 9 shows a front control panel 190 for the encoding system 10. Knobs 192–194 respectively control rotary potentiometers for adjusting input signal gain and saturation. Gain 192 and saturation 194 are variable between +/–30% in 0.5% steps.

Prefilter switch 196 allows the user to select prefiltering or "clean coding" in the luminance and chrominance channels. The selections are: no prefiltering, prefilter luminance, prefilter chrominance, or prefilter luminance and chrominance. Soft clip switch 198 allows the user to select whether the luminance and chrominance channels are hard or soft clipped. The selections are: hard clip both luminance and chrominance, soft clip luminance, soft clip chrominance, soft clip both luminance and chrominance. B/W switch 200 selects monochrome mode. Blank disable switch 202 temporarily allows input blanking to be allowed to pass through the system. Preset switch 204 sets all controls to a unity default level. Memory switches 206 recall user programmable setup configurations. Each switch 206 recalls 1 of 2 setup configurations, depending on the NTSC or PAL operating mode. Save switch 208 allows a set of selected parameters to be stored as one of the four preset combinations as chosen with the memory switches 206. Display switch 210 will overlay current/chosen preset parameters which are always shown on a separate display overlaid on the video image and also selects which of two video pages are displayed. When held in, it toggles the overlaid display ON and OFF.

Figure 10:
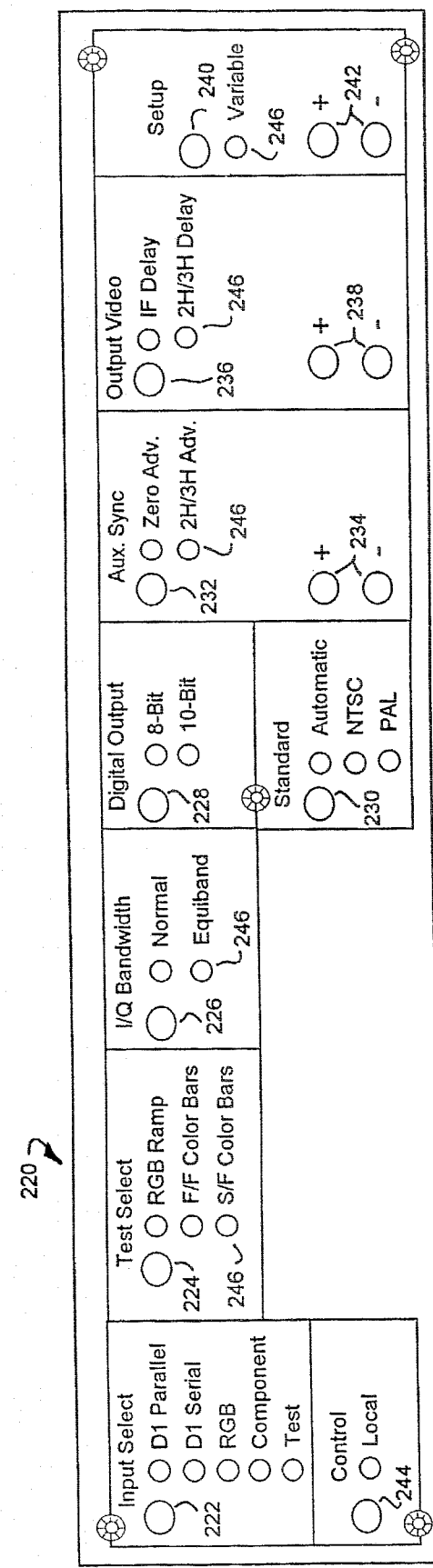
FIG. 10 is a plan view of another control panel for the encoding system of FIGS. 1–5 and 7.

FIG. 10 shows an inner control panel 220 for the encoding system 10. Switch 222 allows selection among D1 parallel, D1 serial, RGB, component and internal test signal inputs. Test select switch 224 provides choice of which internally generated test patterns are displayed when the test signal input is selected. I/Q bandwidth switch 226 selects between normal and equiband (1.2 MHz) operation. Digital output switch 228 selects whether a full 10 bits of resolution is supplied to the D2 output or if the D2 output is rounded to 8 bits for standard 8-bit D2 equipment. Standard select switch 230 allows automatic selection of the output standard based on input reference timing or manual selection of either the NTSC or the PAL standard. Auxiliary synchronization switch 232 selects whether an auxiliary synchronization output is advanced 2H for NTSC standard outputs or 3H for PAL outputs to match the encoder delay. Auxiliary synchronization +/– switches 234 adjust the auxiliary synchronization output with respect to the reference synchronization and subcarrier phase with respect to the reference subcarrier. The range of adjustment is +/–4.7 μsec. in degrees of subcarrier clock and +/45 degrees of subcarrier. Output video switch 236 selects whether the output video is delayed 2H for NTSC standard outputs or 3H for PAL standard outputs or 1 frame with respect to the input. Output video +/– switches 238 adjust the output video delay with respect to reference synchronization and subcarrier phase with respect to the reference subcarrier. The range of adjustment is +/–4.7 μsec. in degrees of subcarrier clock and +/45 degrees of subcarrier. Setup switch 240 selects whether the output setup is variable or fixed at the default level of 7.5 IRE. Setup +/– switches 242 adjust the output setup when setup is variable. Range of the adjustment is 0–15 IRE in 0.25 IRE steps. Control switch 244 selects between control from the panels 190 and 220 on the encoding system 10 or the corresponding remote panel 24 (FIG. 1), connected to the encoding system 10 by an RS-422 port. LEDs 246 on the control panels 190 and 220 display selections made by the control switches or other conditions of the encoding system 10.

Figure 11:
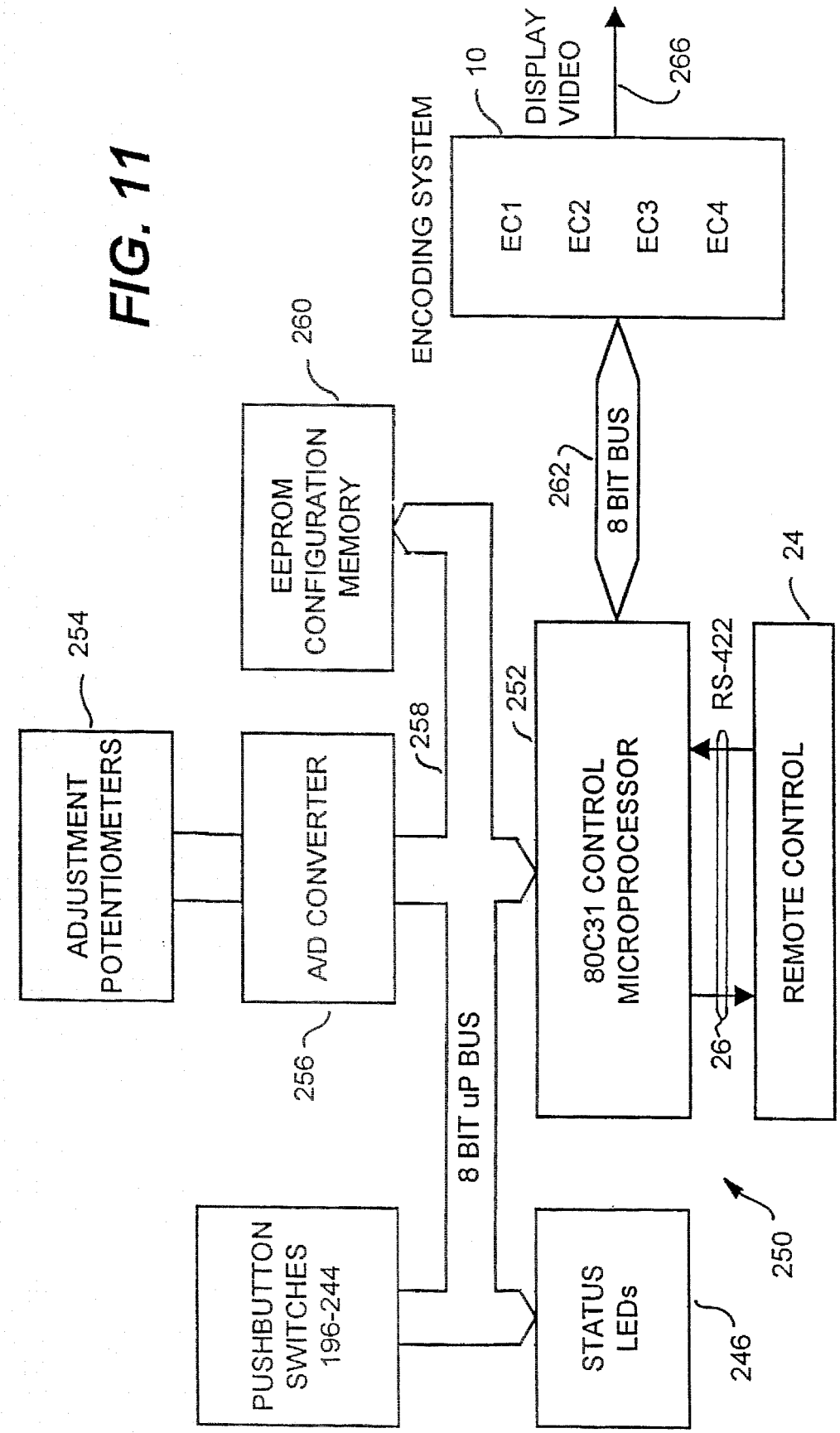
FIG. 11 is a block diagram of a control system for the encoding system of FIGS. 1–5 and 7.

FIG. 11 is a block diagram of a control system 250 for the encoding system 10. In the control system 250, an 80C31 type microprocessor integrated circuit 252 receives inputs from adjustment potentiometers 254 of the control panels 190 and 220 through an A/D converter 256 on bus 258. The switches 196–244 of the control panels 190 and 220 supply inputs to the microprocessor 252 on bus 258. Corresponding inputs are provided by the remote control panel 24 on RS-422 port 26 when remote operation is selected. The remote control 24 can also be an external computer controlling the encoding system 10 on a scene-by-scene basis by emulating the remote control panel. Bidirectional bus 262 supplies outputs from the microprocessor to the encoding unit 10 and receives inputs for the microprocessor 252 from the encoding unit 10. Bus 262 supplies text outputs from the microprocessor 252 for output by the encoding unit on line 266 for separate and overlaid display on a video monitor. Bus 258 provides outputs from the microprocessor 252 for LED's 246 on the control panels 190 and 220.

In operation, by using all-digital encoding techniques, the encoding system 10 provides consistent and predictable encoding results without annoying luminance and color cross-products. With the all-digital processing, re-calibration before each critical session is not necessary to get consistent encoding results. The digital control system 250 provides precise, repeatable and stable changes in encoding parameters. Because the controls are digitally created, the system 10 can store complete encoding set-ups, which can be instantly recalled for quick change between encoding requirements, even on a scene to scene basis.

The composite output of the encoding system 10 is either standard-composite or pre-filtered to remove luminance and color cross-products generated by some types of video picture material, that cause dot crawl and rainbows. The result is sharper and cleaner composite video, even for the most difficult encoding situations.

It has previously been necessary to combine prior art systems to provide all of the typical operational features for component to composite video signal encoding. All of the commonly used operational features are built into the encoding system 10, including digital D1 input, RGB and analog component input, digital D2 and analog composite output, auto switching between PAL and NTSC, sync pulse generation, and analog and digital key channel delay.

Because of the delay that is inevitable in an encoder, it is necessary to advance the timing of equipment feeding it to keep the encoder's output in time with the rest of a facility. Prior art systems have required the addition of one or more sync pulse generators to do the timing compensation. In the system 10, the sync pulse generation is built-in.

In the system 10, the input and output of the system are separately timed. The input is timed from the sync accompanying the input signal. The output is timed from the composite reference signal. This means that the input of the system can be switched between differently timed sources without affecting the timing of its output. Also, because the timing of the system input is set by the composite reference input signal, changing its output timing to match different destinations is as simple as routing a properly timed reference to the composite reference input. To make it even easier, predetermined output timing values for PAL and for NTSC can be stored as part of parameter set-ups in memory.

For maintaining the timing of a key signal with its associated video, the system 10 has a key delay channel with both an analog and a digital input. This linear 8bit monochrome channel always matches the delay of the key to the delay of the video.

The complete operational status of the system 10 is displayed in video form. There is a dedicated video output for the status display, or it can be overlaid onto one of the analog composite video outputs. This status display shows the exact setting of all controls and modes as well as specific operational warnings.

It should now be readily apparent to those skilled in the art that a novel video signal component to composite encoding system and method capable of achieving the stated objects of the invention has been provided. The system and method uses all-digital techniques for the encoding to provide consistent and predictable encoding results without annoying luminance and color cross-products. The system does not require re-calibration before each critical session to get consistent encoding results. The system and method interpolates between sampling intervals for rate conversion of component video signals without requiring a doubling of clock frequency. The system and method eliminates abrupt transitions between the visible and non-visible portions of the composite video signals. The system and method provides digital control of important video correction and encoding parameters. The system stores complete encoding set-ups which can be recalled for quick change between encoding requirements, even on a scene to scene basis. The system incorporates all of the conventionally used encoding operational features built-in a single system.

It should further be apparent to those skilled in the art that various changes in form and details of the invention as shown and described may be made. It is intended that such changes be included within the spirit and scope of the claims appended hereto.

What is claimed is:

1. A control system for an encoding system, said encoding system receiving data associated with input signal processing encoding parameters and in response to said parameter data encoding input color signals of a component video signal into an output composite video signal, the control system comprising:

a control processor;

external means, coupled to said control processor, for providing user selectable input signal processing parameter data to said control processor;

said external means including selector means for selecting between a first and a second data mode for at least one of said input signal processing parameters and adjustment means for adjusting an input data value over a predetermined fixed range of values for at least a second one of said input signal processing parameters;

interface means coupled between said control processor and said encoding system for providing an input signal processing parameter configuration to said encoding system, said parameter configuration including said user selectable input signal processing parameter data;

wherein said input signal processing parameters include a parameter selected from the group consisting of (a) a prefiltering characteristic, including prefiltering bypassing, affecting prefiltering of input chrominance and input luminance signals resulting from said color signals used by said encoding system to produce said composite video signal, (b) a gain adjustment characteristic affecting compensation for deviations from a standard value of amplitude of said color signals, (c) a compensation adjustment affecting compensation for saturation of said color signals, (d) a clipping adjustment affecting a maximum clipping amplitude level of said color signals, (e) a clipping mode parameter affecting selection of clipping mode, (f) a chrominance bandwidth filtering characteristics affecting chrominance filtering for said composite video signal, (g) an input signal blanking disabling parameter that enables an input blanking signal to pass through said encoding system, (h) an in-phase/quadrature I/Q filter parameter affecting chroma-bandwidth of said encoding system, (i) a monochrome/color mode parameter affecting color encoding of said encoding system, (j) a sync parameter affecting compensation of an input time delay associated with said encoding system, (k) an output time parameter affecting compensation of an output time delay associated with said encoding system including chrominance phase adjustment for said composite video signal, (l) a setup parameter affecting a luminance offset associated with said composite video signal, and (m) a standard parameter resulting in PAL-standard or NTSC-standard encoding of said output composite video signal.

2. The control system of claim 1, wherein data associated with at least one of said parameters is provided to said encoding system during a vertical blanking interval associated with said color signals.

3. The control system of claim 1, wherein said external means includes an external computer coupled to said control processor.

4. The control system of claim 1, wherein data associated with at least one of said parameters is provided to said encoding system at a default level.

5. The control system of claim 1, further including storage means for memorializing a user-programmable setup configuration for at least one of said parameters.

6. The control system of claim 1, further including display means for displaying data associated with at least one of said parameters as an image overlaying a video display generated by said encoding system.

7. The control system of claim 1, wherein said external means includes remote control means, coupled to said control processor, for permitting remote user selection of data associated with at least one of said parameters to be provided to said encoding system.

8. The control system of claim 1, wherein said external means includes a front panel of said encoding system;

said front panel including user selector means for selecting data associated with at least one of said parameters to be provided to said encoding system.

9. In an encoding system that receives data associated with input signal processing encoding parameters and in response to said parameter data encodes input color signals of a component video signal into an output composite video signal, an external control apparatus, coupled to said encoding system, said external control apparatus providing and controlling data associated with at least one of said parameters for transmission to said encoding system during a vertical blanking interval associated with said color signals;

said control apparatus including:

a control processor;

external means, coupled to said control processor, for providing user selectable input signal processing parameter data to said control processor; and interface means coupled between said control processor and said encoding system for providing an input signal processing parameter configuration to said encoding system, said parameter configuration including said user selectable input signal processing parameter data;

wherein said input signal processing parameters include a parameter selected from the group consisting of (a) a prefiltering characteristic, including prefiltering bypassing, affecting prefiltering of input chrominance and input luminance signals resulting from said color signals used by said encoding system to produce said composite video signal, (b) a gain adjustment characteristic affecting compensation for deviations from a standard value of amplitude of said color signals, (c) a compensation adjustment affecting compensation for saturation of said color signals, (d) a clipping adjustment affecting a maximum clipping amplitude level of said color signals, (e) a clipping mode parameter affecting selection of clipping mode, (f) a chrominance bandwidth filtering characteristics affecting chrominance filtering for said composite video signal, (g) an input signal blanking disabling parameter that enables an input blanking signal to pass through said encoding system, (h) an in-phase/quadrature I/Q filter parameter affecting chroma-bandwidth of said encoding system, (i) a monochrome/color mode parameter affecting color encoding of said encoding system, (j) a sync parameter affecting compensation of an input time delay associated with said encoding system, (k) an output time parameter affecting compensation of an output time delay associated with said encoding system including chrominance phase adjustment for said composite video signal, (l) a setup parameter affecting a luminance offset associated with said composite video signal, and (m) a standard parameter resulting in PAL-standard or NTSC-standard encoding of said output composite video signal.

10. The external control apparatus of claim 9, wherein said external control apparatus includes an external computer coupled to said control processor.

11. The external control apparatus of claim 9, wherein data associated with at least one of said parameters is provided to said encoding system at a default level.

12. The external control apparatus of claim 9, further including storage means for memorializing a user-programmable setup configuration for at least one of said parameters.

13. The external control apparatus of claim 9, further including display means for displaying data associated with at least one of said parameters as an image overlaying a video display generated by said encoding system.

14. The external control apparatus of claim 9, further including remote control means, coupled to said external control apparatus, for permitting remote user selection of data associated with at least one of said parameters to be provided to said encoding system.

15. The external control apparatus of claim 9, wherein said external control apparatus includes a front panel of said encoding system;

said front panel including user selector means for selecting data associated with at least one of said parameters to be provided to said encoding system.

* * * * *